(12) United States Patent
Brown

(10) Patent No.: US 6,986,368 B2
(45) Date of Patent: Jan. 17, 2006

(54) HYDRAULIC CONTROL SYSTEM FOR TREE CUTTING SAW

(75) Inventor: Larry Brown, Grande Prairie (CA)

(73) Assignee: Risley Enterprises Ltd., Grande Prairie (CA)

( * ) Notice: Subject to any disclaimer, the term of this patent is extended or adjusted under 35 U.S.C. 154(b) by 140 days.

(21) Appl. No.: 10/208,806

(22) Filed: Aug. 1, 2002

(65) Prior Publication Data

US 2004/0020561 A1  Feb. 5, 2004

(51) Int. Cl.
*A01G 23/091* (2006.01)

(52) U.S. Cl. .................. 144/4.1; 144/34.1; 144/382; 144/24.12; 60/431; 60/449

(58) Field of Classification Search .............. 144/335, 144/3.36, 339, 356, 382, 4.1, 34.1, 29.12, 144/218; 60/414, 431, 448, 449, 452, 470, 60/487, 443, 451, 445, 490; 83/928, 639.1–639.7
See application file for complete search history.

(56) References Cited

U.S. PATENT DOCUMENTS

| | | | | |
|---|---|---|---|---|
| 4,448,021 A | * | 5/1984 | Hawkins | 60/449 |
| 4,531,366 A | * | 7/1985 | Moriya et al. | 60/421 |
| 4,735,049 A | * | 4/1988 | Ketonen | 60/484 |
| 5,203,388 A | * | 4/1993 | Bowling | 144/24.12 |
| 5,293,914 A | * | 3/1994 | Hudson | 144/24.13 |
| 5,528,843 A | * | 6/1996 | Rocke | 37/348 |
| 5,588,474 A | * | 12/1996 | Egging | 144/24.12 |
| 6,408,906 B1 | * | 6/2002 | Moon et al. | 144/24.13 |
| 6,431,231 B1 | * | 8/2002 | Braaten et al. | 144/24.12 |

* cited by examiner

*Primary Examiner*—Derris H. Banks
*Assistant Examiner*—Shelley Self
(74) *Attorney, Agent, or Firm*—Oyen Wiggs Green & Mutala LLP

(57) ABSTRACT

A hydraulic circuit for a tree-cutting machine having a feed mechanism powered by hydraulic fluid at the output of a hydraulic motor. The hydraulic motor may comprise a variable-displacement motor. The hydraulic circuit may comprise elements which provide an anti-stall mode, wherein the feed mechanism is operated to withdraw the cutting element upon pressure at an input port of the hydraulic motor exceeding a threshold.

44 Claims, 2 Drawing Sheets

HYDRAULIC CONTROL SYSTEM FOR TREE CUTTING SAW

TECHNICAL FIELD

This invention relates to hydraulically driven saws of the type used to harvest trees and cut logs.

BACKGROUND

Tree harvesting machines such as feller buncher machines have saws for cutting off trees. It is typical for such saws to be driven by hydraulic motors. Many tree harvesting machines have circular saw blades for cutting off trees and/or bucking logs to length. Such circular saw blades typically comprise a rotatable disc with cutting teeth mounted around the periphery of the disc. The saw may be called a "cutting element".

In addition to the cutting element, some tree harvesting machines have hydraulic actuators, which control the advance of the cutting element into a tree or log. These actuators may be called a "feed mechanism".

When harvesting trees or when bucking logs to length, the torque required to drive the cutting element varies depending on many factors including, inter alia, tree diameter, wood density, location of the cutting element within the tree, localized characteristics of the tree (i.e. knots) and speed of the feed mechanism. Typically, the torque required to cut through a relatively large tree will be greater than that required to cut through a smaller tree. Also, the torque required to drive the cutting element will typically increase as the cutting element moves from the outside of a tree to its center and then will decrease again as the cutting element moves from the center of the tree to its opposite side.

Typically, tree harvesting machines are built with hydraulic motors that rotate the cutting element to cut through trees and logs. In order to successfully cut through large trees and logs, the hydraulic motors must be configured to provide significant torque. However, high torque hydraulic motors rotate the cutting element relatively slowly. The result is a lack of cutting efficiency for smaller trees and logs, which may be cut faster with motors making more revolutions per minute.

To solve this problem, some wood cutting machines employ two hydraulic motors, one configured to operate at high torque (but at low speed) and the other configured to operate more quickly (but at lower torque). This solution is inadequate, because of the cost of providing, operating and maintaining hydraulic motors and the time involved to change from one motor to the other in different operating conditions.

Manual-advance tree harvesting machines may also be equipped with high-speed (or variable speed) motors. Manual-advance tree harvesting machines may not be effective for larger trees and rely on the skill of the operator to feed the cutting element through the tree at an appropriate rate. In addition, manual advance tree harvesting machines may subject their operators to a greater risk of injury.

Another known technique involves the use of a two-speed feed mechanism. The rate of advance of the cutting element into the tree can be reduced when the motor driving the cutting element is experiencing high torque. This technique does not provide a mechanism for controlling the speed of the cutting element itself.

There is a need for hydraulic systems for saws that improve tree and/or log cutting efficiency and ameliorate some of the drawbacks of the prior art.

SUMMARY OF THE INVENTION

In accordance with the invention, a hydraulic system for controlling and actuating a cutting apparatus is disclosed. The hydraulic system comprises a hydraulic motor, a cutting element coupled to be driven by the hydraulic motor, one or more feed actuators coupled to advance or retract the cutting element, and a control system. The control system is connected in series with the motor to deliver the hydraulic fluid to the one or more feed actuators at a selected pressure and rate of flow. The selected pressure and rate of flow control advancing movement of the cutting element.

The motor may be a variable displacement motor comprising an actuator that increases the displacement of the motor when a fluid pressure at the motor input port exceeds a threshold pressure.

The hydraulic system may comprise one or more hydraulic elements configured to temporarily retract the cutting element while the torque experienced by the cutting element is above a threshold. The hydraulic elements may comprise a pressure-operated valve connected to redirect a flow of hydraulic fluid in response to a pressure of the hydraulic fluid at a motor input port.

The control system may comprise a pressure relief valve and a flow control valve, which may be connected to receive hydraulic fluid from a motor output port and to respectively maintain the hydraulic fluid at the selected pressure and transmit the hydraulic fluid at the selected rate of flow.

The control system may comprise a pressure reducing valve and a flow control valve, which may be connected to receive hydraulic fluid from the motor input port and to respectively maintain the hydraulic fluid at the selected pressure and transmit the hydraulic fluid at the selected rate of flow.

The control system may comprise a first flow control valve in series with a check valve, which are connected to maintain the hydraulic fluid at the selected pressure, and a flow control valve, which is connected to transmit the hydraulic fluid at the selected rate of flow.

The control system may comprise one or more valves capable of creating a pressure when they transmit hydraulic fluid, which are connected to maintain the hydraulic fluid at the selected pressure, and a flow control valve, which is connected to transmit the hydraulic fluid at the selected rate of flow.

The hydraulic system may include one or more hydraulic elements configured to prevent advancement of the cutting element in the absence of pressurized hydraulic fluid at the motor input port.

The hydraulic system may include a check valve connected between the motor input port and the motor output port.

The cutting element may comprise a rotatable saw blade and the feed actuators may comprise one or more hydraulic cylinders.

The hydraulic system may also comprising a direction control valve which is switchable between: a first configuration, wherein pressurized hydraulic fluid is directed in a first direction to actuate the motor and to advance the cutting element; and a second configuration, wherein pressurized hydraulic fluid is directed in a second direction to retract the cutting element.

Another aspect of the invention involves a hydraulic system for controlling and actuating a tree and log cutting apparatus. The hydraulic system comprises: a variable displacement motor, which receives pressurized hydraulic fluid at a motor input port; and a cutting element coupled to be driven by the variable displacement motor. The variable displacement motor is capable of increasing its torque output in response to increases in a cutting pressure experienced by the cutting element and is capable of increasing its speed output in response to decreases in the cutting pressure experienced by the cutting element.

Another aspect of the invention involves a tree cutting machine, which comprises: a source of pressurized fluid, a motor connected to the source of pressurized fluid, a cutting element coupled to be driven by the motor, and a feed mechanism connected in series with the motor. The feed mechanism is coupled so as to advance the cutting element into a tree being cut.

Further aspects of the invention and features of specific embodiments of the invention are described below.

BRIEF DESCRIPTION OF THE DRAWINGS

In drawings which illustrate specific embodiments of the invention.

DESCRIPTION

Throughout the following description, specific details are set forth in order to provide a more thorough understanding of the invention. However, the invention may be practiced without these particulars. In other instances, well known elements have not been shown or described in detail to avoid unnecessarily obscuring the invention. Accordingly, the specification and drawings are to be regarded in an illustrative, rather than a restrictive, sense.

Figure 1:
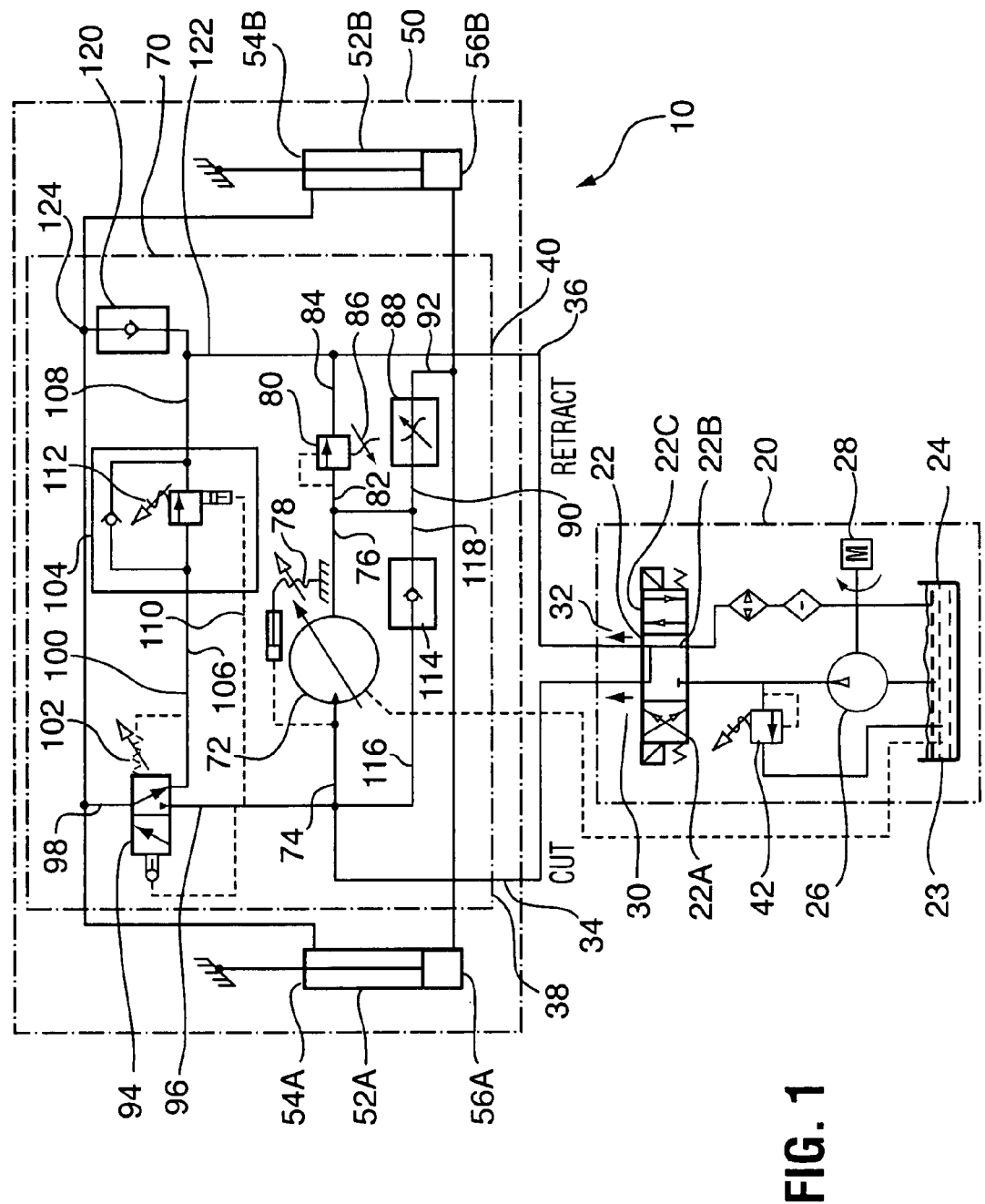
FIG. 1 is a schematic diagram illustrating a hydraulic circuit of a tree cutting machine according to one embodiment of the invention.

FIG. 1 is a schematic view of a hydraulic circuit 10 for a tree cutting machine (not shown) according to one embodiment of the invention. Hydraulic circuit 10 provides for simultaneous control of feed cylinders 52A and 52B (referred to collectively as feed cylinders 52), which actuate the feed mechanism (not shown) of the tree cutting machine, and motor 72, which actuates the cutting element (not shown) of the tree cutting machine.

Hydraulic circuit 10 comprises three main subsystems: carrier circuit 20, saw carriage 50 and control block 70. The division of hydraulic circuit 10 into these three subsystems is primarily for ease of explanation. It will be understood to those skilled in the art, that many of the components of these systems are interchangeable between subsystems and that the physical location of various components of each subsystem may also be changed.

Carrier circuit 20 comprises a tank 24 and at least one carrier pump 26, which is driven by prime mover 28. In general, prime mover 28 may be any mechanism capable of powering pump 26, including without limitation, electric powered engines and internal combustion engines. Depending on the direction of operation of hydraulic circuit 10 (i.e. the direction of operation of the tree cutting machine), hydraulic fluid 23 is pumped in a circuit from tank 24 to saw carriage 50 and control block 70 and then back to tank 24 through conduits 34 and 36 and ports 38 and 40. Main system pressure relief valve 42 limits the pressure of fluid 23 in hydraulic system 10.

Saw carriage 50 houses the cutting element, which is rotationally driven by a hydraulic motor 72. Saw carriage 50 advances in the cutting direction, to permit the cutting element to cut through a tree (not shown) or retracts to withdraw the cutting element from a tree. Feed cylinders 52 are the actuators responsible for the movement of saw carriage 50. Although the invention may be practised with any number of feed cylinders 52, it is preferable to have two or more feed cylinders 52, because a feed cylinder 52 may be located on either side of the cutting element, such that the load may be shared by the two or more feed cylinders 52.

Each feed cylinder 52 comprises two ends, a rod end 54 and a barrel end 56. When the pressure of hydraulic fluid 23 at the barrel ends 56 of feed cylinders 52 is greater than that of hydraulic fluid 23 at the rod ends 54 of feed cylinders 52, saw carriage 50 advances to advance the cutting element and cut through the tree. Conversely, when the pressure of hydraulic fluid 23 at the rod ends 54 of feed cylinders 52 is greater than that of hydraulic fluid 23 at barrel ends 56 of feed cylinders 52, saw carriage 50 retracts to withdraw the cutting element from the tree.

Control block 70 comprises a number of valves, ports and conduits, which facilitate control of motor 72 and feed cylinders 52. Specifically, control block 70 comprises a feed pressure relief valve 80 and feed pressure flow control valve 88, which control the force and speed with which feed cylinders 52 move saw carriage 50 to advance the cutting element into the tree. Anti-stall valve 94, causes hydraulic circuit 10 to operate in an "anti-stall mode", where feed cylinders 52 operate in reverse for brief periods in order to prevent motor 72 from stalling, due to excessive torque experienced by the cutting element. Lock back valve 104 is a safety device that prevents the movement of saw carriage 52 in situations where motor 72 is not operating. Check valve 114 allows motor 72 to run on when the supply of pressurized hydraulic fluid is removed to avoid pressure spikes and prevent cavitation, which may cause mechanical damage to motor 72. Reverse flow check valve 120 facilitates rapid and complete withdrawal of saw carriage 50 from a tree by allowing pressurized fluid to flow into the rod ends 54 of feed cylinders 52.

In operation, hydraulic fluid 23 in tank 24 is pressurized by pump 26, which is operated by prime mover 28. System pressure relief valve 42 limits the main system pressure. Throughout this description, the phrase "main system pressure" refers to pressure generated by pump 26 and the phrase "main system pressure limit" refers to the threshold of pressure relief valve 42. Although the main system pressure may generally be set at any level, preferred embodiments operate with a main system pressure limit that is between 3000 to 5000 PSI.

Hydraulic circuit 10 has two principal modes of operation: (i) forward direction operational mode (i.e. tree cutting); and (ii) reverse direction operational mode (i.e. retracting of the saw in preparation to cut the next tree). The forward direction operational mode of hydraulic circuit 10 also includes an anti-stall mode as will be explained further below. Carrier direction control valve 22 determines the mode of operation by directing hydraulic fluid through circuit 10 in direction 30 for forward direction operation or in direction 32 for reverse direction operation.

To cut trees, hydraulic circuit 10 operates in the forward direction operational mode with pressurized hydraulic fluid flowing through carrier direction control valve 22 in direction 30. This mode is selected by configuring valve 22 so that section 22A is in the fluid path. In this mode, hydraulic fluid 23 flows through connecting conduit 34 into saw carriage 50 and control block 70 at port 38. In saw carriage 50 and control block 70, hydraulic fluid 23 drives the movement of cutting element motor 72 and feed mechanism cylinders 52, before completing the circuit by returning to tank 24 via port 40, conduit 36 and carrier direction control valve 22.

Pressurized hydraulic fluid in control block 70 flows through motor 72 via motor input port 74 and motor output port 76. This flow of hydraulic fluid through motor 72 causes rotation of motor 72 and corresponding rotation of the cutting element. The pressure of the hydraulic fluid at input port 74 may be maintained relatively high. For example, such pressures may be in the range of 3000 to 5000 PSI. In the illustrated embodiment, the pressure of the hydraulic fluid at input port 74 is the same as the main system pressure and is maintained by pump 26 and the load experienced by the cutting element.

In the illustrated embodiment, motor 72 is a variable displacement motor, which is capable of operating at various combinations of speed and displacement. The torque of motor 72 is related to its displacement, such that higher displacement results in higher torque and lower displacement results in lower torque. At low displacement (i.e. low torque), motor 72 may operate at relatively high speed. Conversely, at high displacement (i.e. high torque), the speed of motor 72 is reduced. The displacement of variable displacement motor 72 may be controlled by adjustable control element 78. Consequently, the speed and torque of the cutting element may be controlled by adjustable control element 78.

Adjustable control element 78 may be set to increase the displacement of motor 72 when the fluid pressure at input port 72 increases above a threshold pressure that is lower than the main system pressure limit. For example, adjustable control element 78 may be set to operate at 400 to 1000 PSI less than the main system pressure limit. In typical operation, motor 72 may begin cutting at high speed (i.e. low displacement). When the cutting element and motor 72 experience increased load (because the cutting element is nearing the center of a large tree, for example), then the hydraulic fluid pressure at motor input port 74 will increase. Once the hydraulic fluid pressure at motor input port 74 reaches the threshold of adjustable control element 78, control element 78 operates to increase the displacement of motor 72 and to provide the cutting element with increased torque and correspondingly reduced speed. When the load on motor 72 is reduced again (because the cutting element has passed the center of a large tree, for example), the fluid pressure at motor input port 74 will fall below the threshold of adjustable control element 78 and the displacement of motor 72 will decrease again, so that the cutting element may rotate at the highest possible speed. Preferably, adjustable displacement motor 72 allows continuous variation of displacement, but the invention could also function with discrete (i.e. "step" type) variation in displacement.

In the illustrated embodiment, a check valve 114 is connected between motor input port 74 and motor output port 76. One of the functions of check valve 114 is to allow motor 72 to run on when the supply of hydraulic fluid is shut off. Check valve 114 helps to prevent damage to motor 72, which may result from the inability of motor 72 to stop or change direction instantly when the flow of hydraulic fluid changes.

Once hydraulic fluid 23 exits motor 72 from motor output port 76, it encounters feed pressure relief valve 80 and feed mechanism flow control valve 88. Feed pressure relief valve 80 may be set to a certain pressure threshold by adjustment setting 86. If the hydraulic fluid pressure at the input port 82 of feed pressure relief valve 80 is higher than the pressure threshold of setting 86, then fluid 23 is released through the output port 84 of feed pressure relief valve 80 and back to tank 24 via conduit 36 and port 40. In this manner, hydraulic fluid 23 at the threshold pressure (determined by adjustment setting 86) is presented to the input port 90 of feed mechanism flow control valve 88.

If feed mechanism flow control valve 88 is open, then hydraulic fluid at the threshold pressure of adjustment setting 86 will flow through feed mechanism flow control valve 88. The rate of flow of hydraulic fluid 23 through feed mechanism flow control valve 88 may be determined by a manual or automatic adjustment of the opening of flow control valve 88. The rate of flow of hydraulic fluid 23 through feed mechanism flow control valve 88 may be adjusted from time to time to optimize the speed at which the cutting element is advanced through the tree.

Hydraulic fluid 23 at the pressure determined by feed pressure relief valve 80 and at the flow rate determined by feed mechanism flow control valve 88 enters the barrel ends 56 of feed cylinders 52. The hydraulic fluid 23 entering the barrel ends 56 of feed cylinders 52 causes feed cylinders 52 to advance saw carriage 50 into the tree (i.e. in the cutting direction). The force with which saw carriage 50 advances into the tree is equal to the hydraulic fluid pressure differential between the barrel ends 56 and the rod ends 54 of feed cylinders 52 multiplied by the surface area of the feed cylinders' pistons. Thus, the rate of advance of saw carriage 50 and the force with which saw carriage 50 pushes into a tree are controlled by the threshold pressure setting 86 of feed pressure relief valve 80 and the adjustable flow rate of feed mechanism flow control valve 88.

Typically, although not necessarily, the threshold pressure setting 86 of feed pressure relief valve 80 may be set in the range of 500 to 1500 PSI. The flow rate of feed mechanism flow control valve 88 may be typically, although not necessarilly, in the range of 10 to 30 gallons per minute. This combination of pressure and flow provides for aggressive but smooth advance of the cutting element through the tree, and minimizes the potential that the cutting element (i.e. motor 72) will stall.

When saw carriage 50 is advancing in the manner described above, hydraulic fluid 23 is displaced from the rod ends 54 of feed cylinders 52. In the illustrated embodiment this fluid flows back to tank 24 through anti-stall valve 94 and lock back valve 104. While saw carriage 50 is advancing, anti-stall valve 94 is configured to conduct fluid away from rods ends 54 of feed cylinders 52, through anti-stall port 98 and out anti-stall port 100. Simultaneously, the high pressure hydraulic fluid in conduit 34 is directed to pilot port 110 of lock back valve 104. Because pilot port 110 is pressurized, lock back valve 104 is open and fluid from anti-stall port 100 flows through lock back valve input port 106 to lock back valve output port 108 and back to tank 24 through conduit 36 and port 40.

Lock back valve 104 also provides a safety-related locking function. When motor 72 is not driven (i.e. there is no pressurized hydraulic fluid in conduit 34), then pilot port 110 is not pressurized and lock back valve 104 closes. The closure of lock back valve 104 cuts off the return flow of hydraulic fluid 23 from the rod ends 54 of feed cylinders 52 through lock back valve 104, halting any further advancing movement of saw carriage 50. In this manner, lock back valve 104 may operate as a safety device to prevent saw carriage 50 from advancing, unless the cutting element (i.e. motor 72) is also being driven.

In some circumstances, the torque required to drive the cutting element will exceed the capabilities of motor 72. Ordinarily, such a situation may cause the cutting element (i.e. motor 72) to stall. By way of example, motor 72 may be underpowered when the rate of advance of saw carriage 50 is too fast for the thickness of the tree being cut or when the cutting element becomes jammed or pinched. In these situations, circuit 10 causes saw carriage 50 to go into an "anti-stall mode". In the anti-stall mode, circuit 10 causes saw carriage 50 to automatically retract, until such time as the cutting pressure experienced by the cutting element and motor 72 is reduced. In this manner, the potential that motor 72 will stall may be minimized or eliminated altogether.

The temporary retraction of saw carriage 50 in anti-stall mode is controlled by anti-stall valve 94, which comprises a threshold pressure setting 102. The threshold pressure setting 102 of anti-stall valve 94 is set at a value that is lower than the main system pressure limit, but which is higher than adjustable control element 78 of motor 72. Typically, the threshold pressure setting 102 of anti-stall valve 94 may be set 200 to 300 PSI below the main system pressure limit. When saw carriage 50 is advancing and motor 72 has sufficient power, the pressure of hydraulic fluid at anti-stall valve port 96 (the same pressure experienced at motor input port 74) is less than the level of threshold pressure setting 102. In this situation anti-stall valve 94 is in its "low pressure" mode of operation, where it is configured to conduct hydraulic fluid from anti-stall valve port 98 to anti-stall valve port 100. This hydraulic fluid 23 then returns to tank 24 via lock back valve 104. However, when the pressure of the hydraulic fluid at anti-stall valve port 96 reaches the level of threshold pressure setting 102, anti-stall valve 94 switches into its "anti-stall mode", where the high pressure hydraulic fluid from anti-stall port 96 is conducted to anti-stall port 98.

In operation, anti-stall port 96 is in direct fluid communication with motor input port 74 (i.e. the two ports experience the same fluid pressure). When the load experienced by motor 72 is significant, then the pressure of the hydraulic fluid at motor input port 74 increases. If the pressure at motor input port 74 reaches the level of adjustable control element 78, then the displacement of motor 72 may be increased as discussed above. If the load and the hydraulic fluid pressure at motor port 74 continue to increase, the pressure of the hydraulic fluid will eventually trigger anti-stall valve 94 at the level of threshold pressure setting 102. Once the level of threshold pressure setting 102 is surpassed, hydraulic circuit 10 enters anti-stall mode.

In anti-stall mode, anti-stall valve 94 switches so that high pressure hydraulic fluid is conducted from anti-stall port 96 to anti-stall port 98 and then to the rod ends 54 of feed cylinders 52. The high pressure fluid at the rod ends 54 of feed cylinders 52 creates more force than the lower pressure fluid at the barrel ends 56 of feed cylinders 52. The high pressure on the rod ends 54 of feed cylinders 52 causes feed cylinders 52 to retract. The retraction of feed cylinders 52 in turn causes saw carriage 50 to retract (i.e. move in a direction opposite the cutting direction). Retraction of saw carriage 50 tends to pull the cutting element out of the tree.

The anti-stall mode of hydraulic circuit 10 may last only a short period of time until the load experienced by motor 72 is reduced. When the load experienced by motor 72 is reduced, the fluid pressure at motor input port 74 and anti-stall port 96 will fall back down below the level of threshold pressure setting 102. Once the pressure of the hydraulic fluid at anti-stall port 96 falls below the threshold pressure setting 102, anti-stall valve 94 switches back to its low pressure operational mode such that the hydraulic fluid is directed from the rod ends 54 of feed cylinders 52 through anti-stall port 98, anti-stall port 100 and lock back valve 104.

When anti-stall valve 94 switches back to its low pressure operational mode, saw carriage 50 begins to advance the cutting element into the tree again in the manner described above.

During forward operation and during anti-stall mode operation, reverse flow check valve 120 is closed due to higher pressure at port 124 than is present at port 122.

In the reverse direction operational mode, carrier direction control valve 22 is switched so that fluid flows through section 22C. In this manner, pressurized hydraulic fluid is pumped to saw carriage 50 and control block 70 in direction 32 through conduit 36 and port 40 and is returned to tank 24 via conduit 34 and port 38. When hydraulic fluid flows through circuit 10 in direction 32, feed cylinders 52 cause saw carriage 50 to retract in a direction opposite the cutting direction.

Pressurized hydraulic fluid from conduit 36 enters control block 70 via port 40 and reaches port 122 of reverse flow check valve 120 and port 108 of lock back valve 104. Because the hydraulic fluid at port 122 is pressurized, reverse flow check valve 120 opens, and fluid travels through port 124 to the rod ends 54 of feed cylinders 52. At the same time, pressurized hydraulic fluid may also flow from port 108 to port 106 (through the internal check valve of lock back valve 104) and through ports 100 and 98 (of anti-stall valve 94) until it reaches the rod ends 54 of feed cylinders 52. The combined flow of hydraulic fluid from the reverse flow check valve 120 and from the combination of lock back valve 104 and anti-stall valve 94 enters the rod ends 54 of feed cylinders 52, causing them to retract and thereby causing saw carriage 50 to retract. Hydraulic fluid from the barrel ends 56 of feed cylinders 52 is returned via port 38 and conduit 34 to tank 24 through ports 92 and 90 of feed mechanism flow control valve 88 and through ports 118 and 116 of check valve 114. After saw carriage 50 is retracted, the cutting element is in position to cut another tree.

Feed mechanism flow control valve 88 may comprise a two directional flow control valve as depicted in the illustrated embodiment. Two way flow control facilitates control of the speed of movement of saw carriage 50 in both the forward and reverse directions. Alternatively, flow control valve 88 may comprise a single directional flow control valve. If flow control valve 88 is single directional, then the speed of movement of saw carriage 50 may only be controlled during the forward direction operational mode and hydraulic fluid may flow freely (i.e. saw carriage 50 may move without speed control) in the reverse direction operational mode. Flow control valve 88 may incorporate an internal check valve.

Preferably, direction control valve 22 comprises a motoring spool or some other mechanism (not shown) that allows hydraulic fluid to flow freely through motor 72. Such a motoring spool may allow hydraulic fluid to be drawn from tank 24 to replace hydraulic fluid lost through motor 72 as it slows down. The motoring spool may also provide a return path for hydraulic fluid from the barrel ends 56 of feed cylinders 52 when direction control valve 22 is configured for forward operation and carriage 50 is pushed rearward by a tree. In this manner, the motoring spool helps prevent damage to motor 72, which might otherwise occur when the flow of hydraulic fluid changes suddenly. Sudden changes in the flow of hydraulic fluid could cause pressure spikes, cavitation or mechanical damage to motor 72, because motor 72 can not stop or change direction instantly.

Figure 2:
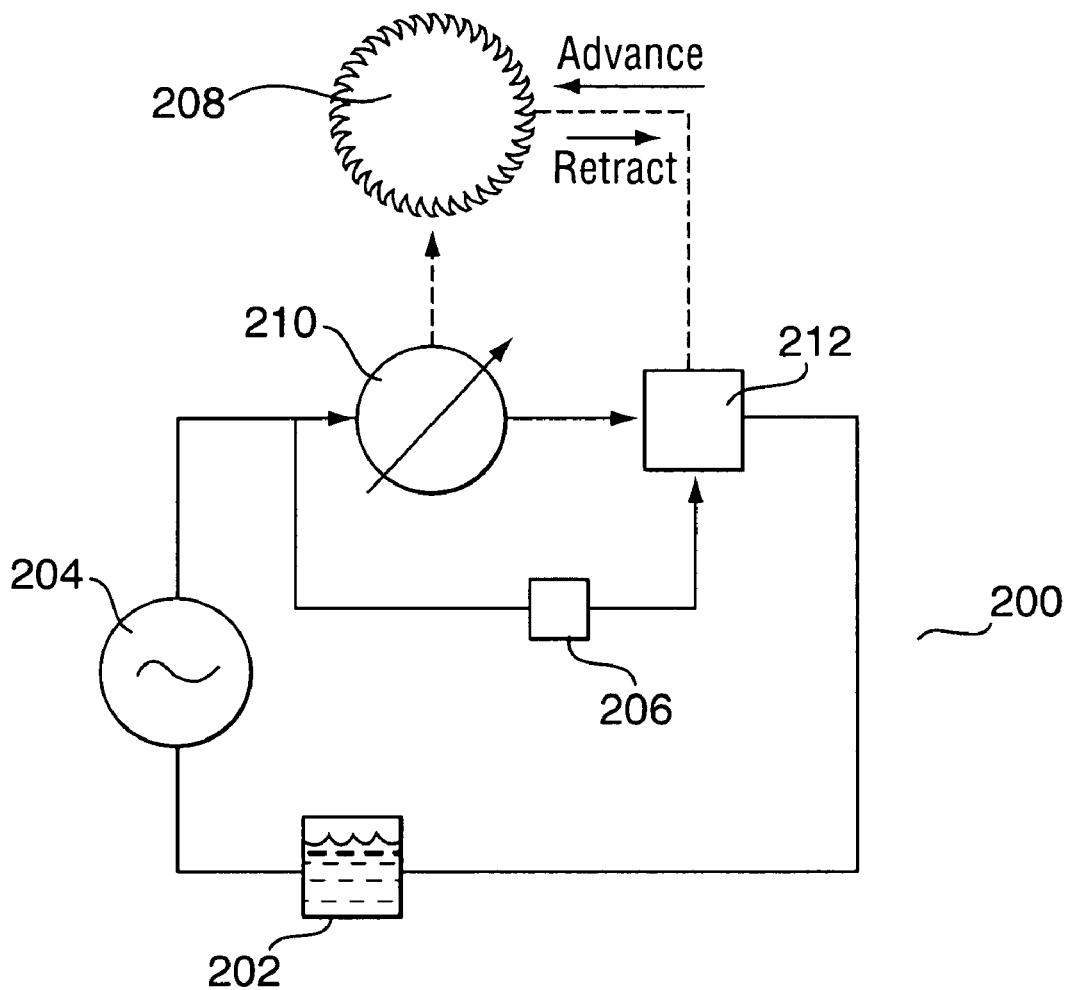
FIG. 2 is a schematic diagram of a tree cutting machine according to a particular embodiment of the invention.

FIG. 2 depicts a schematic illustration of a tree cutting machine 200 according to a particular embodiment of the invention. Tree cutting machine 200 comprises a hydraulic motor 210 for rotating cutting element 208. In the illustrated embodiment, motor 210 is a variable displacement motor. Tree cutting machine 200 also comprises a source of pressurized fluid 202 and a control circuit 204, which supplies pressurized fluid to motor 210.

Cutting element 208 is advanced by feed mechanism 212, which is connected in series with motor 210. In the illustrated embodiment, feed mechanism 212 is connected to the output port of motor 210. In other embodiments, feed mechanism 212 may be connected to the input port of motor 210. Other elements (not shown) may be connected between motor 210 and feed mechanism 212. A pressure sensing element 206 is connected at the input port of motor 210. Pressure sensing element 206 detects a pressure at the motor input port and, if the pressure exceeds a threshold value, causes the feed mechanism to enter an anti-stall mode, wherein cutting element 208 is temporarily retracted until the pressure detected at the motor input port falls below the threshold value again. When pressure sensing element detects that the pressure at the motor input port has fallen below the threshold value, then it cause feed mechanism 212 to begin advancing cutting element 208 again.

In preferred embodiments, pressure sensing element 206 is a pressure operated valve that redirects the flow of pressurized fluid in response to the pressure of fluid at the motor input port (see anti-stall valve 94 described above).

Tree cutting machine 200 may also comprise a control system (not shown in FIG. 2) for feed mechanism 212 that delivers pressurized fluid to the feed mechanism at a selected pressure and a selected rate of flow. For example, such a control system may include a feed pressure relief valve (see valve 80 described above) and a feed mechanism flow control valve (see valve 88 described above).

As will be apparent to those skilled in the art in the light of the foregoing disclosure, many alterations and modifications are possible in the practice of this invention without departing from the spirit or scope thereof. For example:

- operation of carrier direction control valve 22 may be controlled by a manual operator, a computer or an embedded system comprising one or more programmable controllers which may comprise microprocessors;
- reverse check valve 120 may be removed from circuit 10;
- lock back valve 104 may be removed from circuit 10 or may be replaced with a mechanical braking mechanism that prevents movement of saw carriage 50 when motor 72 is not being driven;
- the flow level of feed mechanism flow control valve 88 may be controlled by a manual operator, a computer or an embedded system comprising one or more programmable controllers which may include microprocessors;
- although the above description discusses the cutting or harvesting of trees, this invention has application to the control of saws generally and may be applied to cut logs or trees that have already been felled;
- the adjustable control element 78 of motor 72 and the threshold pressure setting 102 of anti-stall valve 94 may be controlled by a manual operator, a computer or an embedded system comprising one or more microprocessors;
- the variable displacement motor 72 described above may be replaced by one or more fixed displacement motors. With fixed displacement motors, the remainder of hydraulic circuit 10 will operate effectively as described above without the advantages of a variable displacement motor;
- if two or more fixed displacement motors are used in place of variable displacement motor 72, only one fixed displacement motor may be in the circuit at any given time. The other fixed displacement motor(s) may then be connected solely to supply drive power to the cutting element. Valving may be incorporated as between the two of more fixed displacement motors to bypass one or more of the fixed displacement motor(s) and change the speed and torque supplied to the cutting element;
- a sequence valve in combination with a directional valve or another combination of valves may be used in place of anti-stall valve 94 to facilitate the anti-stall mode by directing hydraulic fluid to the rod ends 54 of feed cylinders 52;
- electronic valves may be used to implement anti-stall valve 94, flow control valve 88 and other control valves described above;
- feed pressure relief valve 80 may be replaced by a flow control valve and a check valve in series. With such an implementation, the flow of hydraulic fluid through the flow control valve causes a flow dependent pressure at its input port, which will be felt at the barrel ends 56 of feed cylinders 52, causing them to advance the cutting element as described above. The check valve prevents retracting flow of hydraulic fluid from passing back through motor 72 and check valve 114;
- in general, feed pressure relief valve 80 may be replaced with any valve or combination of valves capable of producing a pressure in response to the flow of hydraulic fluid through the valve(s);
- the feed control system (i.e. valves 80, 88 and feed cylinders 52) may be may be replaced with components that accept pressure from the input port of motor 72, such as a pressure reducing valve and a flow control valve and/or smaller feed cylinders and/or a combination of valves and cylinders that achieve the desired feed pressure and rate of flow; and
- two or more variable displacement motors or any combination of fixed and variable displacement motors may be used in the place of variable displacement motor 72. Such combinations may be implemented in series or parallel to enhance control of the tree harvesting machine by providing a greater range of torque that may be applied to the cutting element.

Accordingly, the scope of the invention is to be construed in accordance with the substance defined by the following claims.

What is claimed is:

1. A hydraulic system for controlling and actuating a cutting apparatus, the hydraulic system comprising:
   a hydraulic motor having an input port and an output port;
   a cutting element coupled to be driven by the hydraulic motor;
   one or more feed actuators coupled to advance or retract the cutting element; and,
   a control system connected in series with the motor and connected to deliver the hydraulic fluid to the one or more feed actuators at a selected pressure and rate of flow, the selected pressure and rate of flow controlling an advancing movement of the cutting element.

2. A hydraulic system according to claim 1, wherein the motor is a variable displacement motor and the hydraulic system comprises an actuator connected to increase a displacement of the motor when a fluid pressure at a motor input port exceeds a threshold pressure.

3. A hydraulic system according to claim 1 comprising one or more hydraulic elements configured to retract the cutting element when a torque experienced by the cutting element increases above a threshold.

4. A hydraulic system according to claim 3, wherein the one or more hydraulic elements configured to retract the cutting element are configured to stop retracting the cutting element when the torque experienced by the cutting element falls below the threshold.

5. A hydraulic system according to claim 3, wherein the one or more hydraulic elements configured to retract the cutting element comprise a pressure-operated valve connected to redirect a flow of hydraulic fluid in response to a pressure of the hydraulic fluid at a motor input port.

6. A hydraulic system according to claim 1, wherein the control system comprises a pressure relief valve and a flow control valve.

7. A hydraulic system according to claim 6, wherein the pressure relief valve is connected to receive the hydraulic fluid from a motor output port and to maintain the hydraulic fluid at the selected pressure.

8. A hydraulic system according to claim 7, wherein the flow control valve is connected to receive the hydraulic fluid from the motor output port at the selected pressure and to transmit the hydraulic fluid at the selected rate of flow.

9. A hydraulic system according to claim 1, wherein the control system comprises a pressure reducing valve and a flow control valve.

10. A hydraulic system according to claim 9, wherein the pressure reducing valve is connected to receive the hydraulic fluid from a motor input port and to maintain the hydraulic fluid at the selected pressure and the flow control valve is connected to transmit the hydraulic fluid at the selected rate of flow.

11. A hydraulic system according to claim 1, wherein the control system comprises a first flow control valve in series with a check valve, which are connected to maintain the hydraulic fluid at the selected pressure, and a flow control valve, which is connected to transmit the hydraulic fluid at the selected rate of flow.

12. A hydraulic system according to claim 1, wherein the control system comprises one or more valves capable of creating a pressure when they transmit hydraulic fluid, which are connected to maintain the hydraulic fluid at the selected pressure, and a flow control valve, which is connected to transmit the hydraulic fluid at the selected rate of flow.

13. A hydraulic system according to claim 1 comprising one or more hydraulic elements configured to prevent advancement of the cutting element in the absence of pressurized hydraulic fluid at a motor input port.

14. A hydraulic system according to claim 1 comprising a check valve connected between a motor input port and a motor output port.

15. A hydraulic system according to claim 1, wherein the cutting element comprises a rotatable saw blade.

16. A hydraulic system according to claim 1, wherein in the one or more teed actuators comprise one or more hydraulic cylinders.

17. A hydraulic system according to claim 1 comprising a direction control valve which comprises a valve element switchable between: a first configuration, wherein pressurized hydraulic fluid is directed in a first direction to actuate the motor and to advance the cutting element; and a second configuration, wherein pressurized hydraulic fluid is directed in a second direction to retract the cutting element.

18. A cutting apparatus comprising:
a rotatable cutting element;
a feed mechanism for advancing and retracting the cutting element in a substantially linear manner; and
a hydraulic system comprising:
a hydraulic motor coupled to rotate the cutting, element, the hydraulic motor having a motor input port and a motor output port;
a control system for controlling the feed mechanism, the control system comprising one or more hydraulic elements connected to receive hydraulic fluid from one of the motor input port and the motor output port and connected to deliver the hydraulic fluid to one or more feed actuators at a selected pressure and rate of flow, the one or more feed actuators capable of advancing and retracting the cutting element.

19. A cutting apparatus according to claim 18 comprising a variable displacement motor and the system comprises an actuator connected to increase a displacement of the motor when a fluid pressure at the motor input port exceeds a threshold pressure.

20. A cutting apparatus according to claim 18 comprising one or more hydraulic elements configured to retract the cutting element when a torque experienced by the cutting element increases above a threshold.

21. A cutting apparatus according to claim 20, wherein the one or more hydraulic elements configured to retract the cutting element are configured to stop retracting the cutting element when the torque experienced by the cutting element falls below the threshold.

22. A cutting apparatus according to claim 20, wherein the one or more hydraulic elements configured to retract the cutting element comprise a pressure-operated valve connected to redirect a flow of hydraulic fluid in response to a pressure of the hydraulic fluid at the motor input port.

23. A cutting apparatus according to claim 18, wherein the control system comprises a pressure relief valve and a flow control valve.

24. A cutting apparatus according to claim 23, wherein the pressure relief valve is coupled to receive the hydraulic fluid from the motor output port and to maintain the hydraulic fluid at the selected pressure.

25. A cutting apparatus according to claim 24, wherein the flow control valve is coupled to receive the hydraulic fluid from the motor output port at the selected pressure and to transmit the hydraulic fluid at the selected rate of flow.

26. A cutting apparatus according to claim 18, wherein the control system comprises a pressure reducing valve and a flow control valve.

27. A cutting apparatus according to claim 26, wherein the pressure reducing valve is connected to receive the hydraulic fluid from the motor input port and to maintain the hydraulic fluid at the selected pressure and the flow control valve is connected to transmit the hydraulic fluid at the selected rate of flow.

28. A cutting apparatus according to claim 18, wherein the control system comprises a first flow control valve in series, with a check valve, which are connected to maintain the hydraulic fluid at the selected pressure, and a flow control valve, which is connected to transmit the hydraulic fluid at the selected rate of flow.

29. A cutting apparatus according to claim 18, wherein the control system comprises one or more valves capable of creating a pressure when they transmit hydraulic fluid, which are connected to maintain the hydraulic fluid at the selected pressure, and a flow control valve, which is connected to transmit the hydraulic fluid at the selected rate of flow.

30. A cutting apparatus according to claim 18, wherein the selected pressure and rate of flow of the hydraulic fluid delivered to the one or more feed actuators determine a speed and force of the one or more feed actuators.

31. A hydraulic system for controlling and actuating a tree and log cutting apparatus, the hydraulic system comprising: a variable displacement hydraulic motor which receives pressurized hydraulic fluid at a motor input port; and a cutting element coupled to be driven by the variable displacement hydraulic motor, the variable displacement motor capable of increasing its torque output in response to increases in a cutting pressure experienced by the cutting element and capable of increasing its speed output in response to decreases in the cutting pressure experienced by the cutting element.

32. A hydraulic system according to claim 31 comprising one or more feed actuators coupled to advance and retract the cutting element, and
one or more hydraulic elements connected to deliver the hydraulic fluid to the one or more feed actuators at a selected pressure and rate of flow to control an advancing movement of the cutting element.

33. A hydraulic system according to claim 32 comprising one or more hydraulic actuators coupled to retract the cutting element, the hydraulic system configured to deliver hydraulic fluid to operate the hydraulic actuators to retract the cutting element when a torque experienced by the cutting element increases above a threshold.

34. A hydraulic system according to claim 33, wherein the hydraulic system is configured to stop retracting the cutting element when the torque experienced by the cutting element falls below the threshold.

35. A hydraulic system according to claim 34 comprising a pressure-operated valve connected to redirect a flow of hydraulic fluid in response to a pressure of the hydraulic fluid at the motor input port.

36. A hydraulic system according to claim 32, comprising a pressure relief valve having an input connected between the motor and the one or more feed actuators and a flow control valve connected in series between the motor and the one or more feed actuators.

37. A hydraulic system according to claim 32, comprising a pressure reducing valve connected to maintain the hydraulic fluid at the selected pressure, and a flow control valve connected to transmit the hydraulic fluid at the selected rate of flow.

38. A tree cutting machine comprising:
a hydraulic system according to claim 31;
a source of pressurized fluid connected to the hydraulic system; and,
a hydraulic feed mechanism connected in series with the hydraulic motor, the hydraulic feed mechanism coupled to advance the cutting element into a tree being cut.

39. The tree cutting machine of claim 38 comprising a pressure-operated valve having a control input connected to an input port of the motor, the pressure-operated valve connected to redirect a flow of pressurized fluid away from the hydraulic feed mechanism in response to a pressure of the pressurized fluid at the motor input port.

40. A tree cutting machine comprising:
a source of pressurized fluid;
a hydraulic motor connected to the source of pressurized fluid;
a cutting element coupled to be driven by the motor; and
a hydraulic feed mechanism connected in series with the hydraulic motors, the hydraulic feed mechanism coupled to advance the cutting element into a tree being cut
wherein the motor is a variable displacement motor and the tree cutting machine comprises an actuator connected to increase a displacement of the motor when a fluid pressure at a motor input port exceeds a threshold pressure.

41. A tree cutting apparatus comprising:
a rotatable cutting element;
a feed mechanism for advancing the cutting element toward a tree to be cut; and
a hydraulic system comprising:
a variable-displacement hydraulic motor coupled to rotate the cutting element, the hydraulic motor having an input port and an output port;
a control system for controlling the feed mechanism, the control system comprising one or more hydraulic elements connected to receive hydraulic fluid from one of the input port and the output port and connected to deliver the hydraulic fluid to the feed mechanism to cause the cutting element to advance at a variable rate dependant on a torque experienced by the hydraulic motor.

42. A tree cutting apparatus according to claim 41 wherein the cutting element comprises a saw blade.

43. A tree cutting machine comprising:
a source of pressurized fluid;
a hydraulic motor connected to the source of pressurized fluid;
a cutting element coupled to be driven by the motor;
a hydraulic feed mechanism connected in series with the hydraulic motor, the hydraulic feed mechanism coupled to advance the cutting element into a tree being cut; and,
a pressure-operated valve having a control input connected to an input port of the motor, the pressure-operated valve connected to redirect a flow of pressurized fluid away from the hydraulic feed mechanism in response to a pressure of the pressurized fluid at the motor input port.

44. A tree cutting machine according to claim 43 wherein the hydraulic motor is a variable-displacement motor.

* * * * *